United States Patent
Kose

(10) Patent No.: US 9,306,219 B2
(45) Date of Patent: Apr. 5, 2016

(54) BINDER COMPOSITION FOR SECONDARY BATTERY, ELECTRODE MIXTURE FOR SECONDARY BATTERY EMPLOYING IT, AND SECONDARY BATTERY

(75) Inventor: Takehiro Kose, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 814 days.

(21) Appl. No.: 13/451,882

(22) Filed: Apr. 20, 2012

(65) Prior Publication Data

US 2012/0231332 A1 Sep. 13, 2012

Related U.S. Application Data

(63) Continuation of application No. PCT/JP2010/069630, filed on Nov. 4, 2010.

(30) Foreign Application Priority Data

Nov. 6, 2009 (JP) ................................. 2009-255030

(51) Int. Cl.
*H01M 4/02* (2006.01)
*H01M 4/62* (2006.01)
*H01M 4/13* (2010.01)

(52) U.S. Cl.
CPC ................ *H01M 4/621* (2013.01); *H01M 4/13* (2013.01); *H01M 4/623* (2013.01); *Y02E 60/122* (2013.01); *Y02P 70/54* (2015.11)

(58) Field of Classification Search
CPC .............................. H01M 4/621; H01M 4/623
USPC ........................................................ 429/211
See application file for complete search history.

(56) References Cited

U.S. PATENT DOCUMENTS 5,714,282 A * 2/1998 Tagawa ......................... 429/217
5,756,230 A    5/1998 Gao et al.

FOREIGN PATENT DOCUMENTS

| CN | 1137284 A | 12/1996 |
|---|---|---|
| JP | 04-249860 | 9/1992 |
| JP | 04-342966 | 11/1992 |
| JP | 08-138652 | 5/1996 |
| JP | 10-233217 | 9/1998 |
| JP | 2003-017065 | 1/2003 |
| JP | 2009-146871 | 7/2009 |

OTHER PUBLICATIONS

International Search Report issued Dec. 28, 2010 in PCT/JP2010/069630 filed Nov. 4, 2010.
U.S. Appl. No. 13/551,157, filed Jul. 17, 2012, Kose, et al.
European Search Report issued Jun. 19, 2013 in EP Application No. 10 82 8320 filed Nov. 4, 2010.
U.S. Appl. No. 14/524,856, filed Oct. 27, 2014, Kose, et al.
Office Action issued Jan. 22, 2014, in Chinese Patent Application No. 201080050497.8 filed Nov. 4, 2010.
U.S. Appl. No. 14/657,475, filed Mar. 13, 2015, Kose, et al.

* cited by examiner

*Primary Examiner* — Jane Rhee
(74) *Attorney, Agent, or Firm* — Oblon, McClelland, Maier & Neustadt, L.L.P.

(57) ABSTRACT

A binder composition of the present invention is for a non-aqueous secondary battery with excellent adhesion between an electrode active material and a current collector. A degree of electrode swelling with an electrolytic solution at a high temperature is small. This binder composition can be used in production of an electrode mixture for a non-aqueous secondary battery. The binder composition can comprise a binder made of a fluorinated copolymer having repeating units derived from tetrafluoroethylene and repeating units derived from propylene, and a solvent or dispersing medium, wherein the fluorinated copolymer has a weight average molecular weight of from 10,000 to 300,000.

10 Claims, No Drawings

BINDER COMPOSITION FOR SECONDARY BATTERY, ELECTRODE MIXTURE FOR SECONDARY BATTERY EMPLOYING IT, AND SECONDARY BATTERY

TECHNICAL FIELD

The present invention relates to a binder composition for a non-aqueous secondary battery, an electrode mixture for a non-aqueous secondary battery obtainable by using it, a process for producing an electrode for a non-aqueous secondary battery, and a non-aqueous secondary battery.

BACKGROUND ART

In recent years, progress of electronic devices has been remarkable, and reduction in size and weight of portable electronic devices has been in progress at a rapid pace. Accordingly, batteries to be used as their power sources are also required to have a high energy density so that they can be made small in size and light in weight. Particularly, as a non-aqueous secondary battery, attention has been drawn to a non-aqueous secondary battery employing lithium or a lithium alloy for a negative electrode and using an electrolyte-impregnated solid electrolyte, or a lithium ion secondary battery employing a carbonaceous material for a negative electrode.

A binder for a battery is usually employed in the form of a binder composition having a polymer to be a binder dissolved or dispersed in water or in an organic solvent. In such a binder composition, an electrode active material is dispersed, and applied to the surface of the current collector, and then the solvent is evaporated to fix the electrode active material to the electrode surface. If the binder fails to fix an adequate amount of the electrode active material to the electrode, a battery having a large initial capacity cannot be obtained, or the electrode active material falls off from the electrode by repetition of charge and discharge, whereby the capacity of the battery decreases.

As the binder composition, two types i.e. an organic solvent type binder composition and an aqueous binder composition are available. As an organic solvent type binder composition, one having polyvinylidene fluoride dissolved in an organic solvent such as N-methylpyrrolidone is widely used (e.g. Patent Document 1). However, if charge and discharge are repeated by a battery having incorporated an electrode obtained by using such an organic solvent type binder composition, there is a problem such that the electrode active material fixed to the electrode is likely to fall off. Further, such an electrode has a problem that it is poor in flexibility, and cracking is likely to be formed on the surface of the electrode when an external force is exerted e.g. in a take-up step in the process for producing a battery.

On the other hand, as an aqueous binder composition, one having carboxymethyl cellulose or the like added as a thickener to an aqueous dispersion of styrene/butadiene copolymer rubber latex produced by using water as a dispersing medium by an emulsion polymerization method employing a surfactant, has been used (e.g. Patent Document 2). Such a rubber polymer is excellent in flexibility as compared with the polyvinylidene fluoride, but the polymer is poor in oxidation resistance, particularly in charge and discharge durability at a high temperature.

In order to solve such problems, as a rubbery fluorinated copolymer, a copolymer comprising repeating units derived, respectively, from vinylidene fluoride, hexafluoropropylene and tetrafluoroethylene, has been proposed as a polymer for a binder composition for an electrode (e.g. Patent Document 3). However, such a fluorinated copolymer tends to undergo swelling at from 60 to 80° C. in an electrolyte of a usual non-aqueous battery using, as a solvent, propylene carbonate, 2-methyltetrahydrofuran, γ-butyrolactone or the like, and it is likely to bring about a decrease in the battery capacity during discharge.

PRIOR ART DOCUMENTS

Patent Documents

Patent Document 1: JP-A-4-249860
Patent Document 2: JP-A-4-342966
Patent Document 3: JP-A-10-233217

DISCLOSURE OF INVENTION

Technical Problem

The present invention has an object to provide a binder composition for a non-aqueous secondary battery whereby it is possible to produce a non-aqueous secondary battery in which adhesion between an electrode active material and a current collector is excellent, swelling of an electrode with an electrolyte at a high temperature is small, and a practical performance is sufficiently exhibited; an electrode mixture for a non-aqueous secondary battery obtained by using such a composition; a process for producing an electrode for a non-aqueous secondary battery; and a non-aqueous secondary battery.

Solution to Problem

The present inventors have found that a binder made of a fluorinated copolymer having repeating units derived from tetrafluoroethylene and repeating units derived from propylene and having a molecular weight being within a certain specific range, is useful for the production of an electrode or a battery, in which swelling of the electrode with an electrolyte is small even at a high temperature, and mutual adhesion between an electrode active material and a current collector of the electrode is high, and which is excellent in charge and discharge characteristics, and the present invention has been accomplished on the basis of such a discovery.

Thus, the present invention provides the following:

[1] A binder composition for a non-aqueous secondary battery, which comprises a binder made of a fluorinated copolymer having repeating units derived from tetrafluoroethylene and repeating units derived from propylene, and an organic solvent, wherein the fluorinated copolymer has a weight average molecular weight of from 10,000 to 300,000.

[2] A binder composition for a non-aqueous secondary battery, which comprises a binder made of a fluorinated copolymer having repeating units derived from tetrafluoroethylene and repeating units derived from propylene, and an aqueous dispersing medium, wherein the fluorinated copolymer has a weight average molecular weight of from 10,000 to 300,000.

[3] The binder composition for a non-aqueous secondary battery according to [2], wherein the binder made of the copolymer is emulsified or dispersed in the aqueous dispersing medium.

[4] The binder composition for a non-aqueous secondary battery according to [3], wherein the binder made of the copolymer is particles having an average particle size of from 10 to 500 nm.

[5] The binder composition for a non-aqueous secondary battery according to any one of [2] to [4], wherein the fluorinated copolymer is a fluorinated copolymer having repeating units derived from tetrafluoroethylene and repeating units derived from propylene and not having repeating units derived from vinylidene fluoride.

[6] The binder composition for a non-aqueous secondary battery according to any one of [2] to [5], wherein the fluorinated copolymer is a fluorinated copolymer consisting solely of repeating units derived from tetrafluoroethylene and repeating units derived from propylene.

[7] The binder composition for a non-aqueous secondary battery according to any one of [2] to [6], which further contains an alcohol, wherein the content of the alcohol is less than 1 part by mass per 100 parts by mass of the binder composition.

[8] An electrode mixture for a non-aqueous secondary battery, which comprises the binder composition for a non-aqueous secondary battery as defined in any one of [1] to [7] and an electrode active material.

[9] A process for producing an electrode for a non-aqueous secondary battery, which comprises applying the electrode mixture for a non-aqueous secondary battery as defined in [8] to a current collector, and removing the organic solvent or aqueous dispersing medium.

[10] A non-aqueous secondary battery comprising an electrode for a non-aqueous secondary battery obtained by the process as defined in [9], a separator and an electrolyte.

Advantageous Effects of Invention

In the non-aqueous secondary battery obtainable by using the binder composition for a non-aqueous secondary battery of the present invention, swelling of the electrode with the electrolyte is small even at a high temperature and mutual adhesion between the electrode active material and the current collector of the electrode is high, and the battery is excellent in charge and discharge characteristics.

DESCRIPTION OF EMBODIMENTS

The fluorinated copolymer contained in the binder composition for a non-aqueous secondary battery (hereinafter sometimes referred to simply as "the binder composition") of the present invention is a fluorinated copolymer having repeating units derived from tetrafluoroethylene and repeating units derived from propylene (hereinafter sometimes referred to simply as "the fluorinated copolymer"). The fluorinated copolymer in the present invention is preferably a copolymer having repeating units derived from tetrafluoroethylene and repeating units derived from propylene, and optionally having repeating units derived from vinylidene fluoride, but more preferably a copolymer having repeating units derived from tetrafluoroethylene and repeating units derived from propylene, and not having repeating units derived from vinylidene fluoride.

Further, the fluorinated copolymer in the present invention may further contain repeating units derived from a fluorinated monomer other than vinylidene fluoride, or a hydrocarbon monomer, to such an extent not to impair the function of the present invention, specifically, at most 10 mol %. However, in the present invention, the fluorinated copolymer is most preferably a copolymer consisting solely of repeating units derived from tetrafluoroethylene and repeating units derived from propylene.

As the fluorinated monomer other than vinylidene fluoride, it is possible to employ a fluorinated olefin such as hexafluoropropylene, chlorotrifluoroethylene or (perfluorobutyl)ethylene, or a fluorinated vinyl ether such as perfluoropropyl vinyl ether or perfluoromethyl vinyl ether.

The hydrocarbon monomer may, for example, be an α-olefin such as ethylene or 1-butene, a vinyl ether such as ethyl vinyl ether, butyl vinyl ether or hydroxybutyl vinyl ether, or a vinyl ester such as vinyl acetate or vinyl benzoate.

The composition of the fluorinated copolymer to be used in the present invention is such that the ratio of repeating units derived from tetrafluoroethylene/repeating units derived from propylene/repeating units derived from vinylidene fluoride is preferably within a range of from 30 to 85/from 15 to 70/from 0 to 50 (mol %), more preferably from 30 to 70/from 20 to 60/from 0 to 40 (mol %).

The content of repeating units derived from vinylidene fluoride should better be small. Specifically, it is preferably at most 25 mol %, more preferably at most 10 mo %, further preferably at most 5 mol %, particularly preferably at most 1 mol %. It is most preferred that repeating units derived from vinylidene fluoride are not contained.

A preferred composition of the fluorinated copolymer in a case where the fluorinated copolymer does not contain repeating units derived from vinylidene fluoride, is such that the ratio of repeating units derived from tetrafluoroethylene/ repeating units derived from propylene is preferably from 80/20 to 30/70 (mol %), more preferably from 70/30 to 40/60 (mol %), most preferably from 60/40 to 50/50 (mol %).

Within such a range of the compositional ratio, swelling of the electrode with a solvent of the electrolyte at a high temperature is small, and in the case of integrating the current collector and the electrode, adhesion will be good between the current collector and the electrode mixture comprising the electrode active material and the binder composition.

When the above fluorinated copolymer is used as a binder for an electrode, one type of the copolymer may be used alone, or two or more types of copolymers different in the repeating unit composition may be used in combination. Further, as the case requires, other polymer compounds may be incorporated.

The above fluorinated copolymer can be produced by a known polymerization method, preferably by a radical polymerization method. The radical polymerization method is not particularly limited, and various radical polymerization methods may be used. However, one initiated by an organic or inorganic radical polymerization initiator, light, heat, ionizing radiation, etc., is preferred. The polymerization form may be a conventional polymerization method such as bulk polymerization, suspension polymerization, emulsion polymerization or solution polymerization, but preferred is emulsion polymerization.

In the binder composition of the present invention, when the molecular weight of the fluorinated copolymer is within the following range, the effects of the present invention can be obtained such that swelling of the electrode with the electrolyte is small even at a high temperature, and the mutual adhesion between the electrode active material and the current collector of the electrode is high, and the battery is excellent in charge and discharge characteristics.

That is, the weight average molecular weight of the above fluorinated copolymer is from 10,000 to 300,000, preferably from 20,000 to 250,000, further preferably from 20,000 to 200,000, particularly preferably from 30,000 to 190,000.

If the weight average molecular weight is lower than the lower limit value, the electrode is likely to be swelled with the electrolyte, and if the molecular weight exceeds the upper limit value, the adhesion tends to deteriorate. The weight average molecular weight can be adjusted by a known method, e.g. addition of a chain transfer agent, control of the polymerization temperature or polymerization pressure, etc.

The binder composition of the present invention contains an organic solvent or aqueous dispersing medium.

The organic solvent may, for example, be ethyl acetate, butyl acetate, acetone, methyl ethyl ketone, methyl isobutyl ketone, hexane, octane, toluene, xylene, naphtha, acetonitrile, N-methylpyrrolidone, acetylpyridine, cyclopentanone, dimethylformamide, dimethyl sulfoxide, methylformamide, methanol or ethanol. Among them, N-methylpyrrolidone or butyl acetate is preferred, and N-methylpyrrolidone is more preferred. The organic solvent may be a solvent composed of only one type of solvent, or a mixed solvent of two or more types of solvents.

Further, in a case where the binder composition contains an organic solvent such as N-methylpyrrolidone, the viscosity of the binder composition is likely to substantially increase, and therefore, it is preferred to use an organic solvent having a small water content, specifically a water content of less than 1,000 ppm, preferably less than 100 ppm.

As the aqueous dispersing medium, water may be used alone, or a mixture of water with an organic solvent soluble in water (hereinafter referred to as a "water-soluble organic solvent") may be used. The organic solvent soluble in water may, for example, be a ketone such as acetone or methyl ethyl ketone; an amine such as triethylamine or aniline; an amide such as N-methylpyrrolidone or dimethylformamide; or an alcohol such as methanol, ethanol, propanol, isopropanol, n-butanol or t-butanol. Among them, an alcohol or an amide is preferred, and an alcohol is more preferred.

Further, among alcohols, methanol, isopropanol or t-butanol is preferred, and t-butanol is more preferred. The water-soluble organic solvent to be used for the aqueous dispersing medium may be one type alone, or two or more types in combination.

As the aqueous dispersing medium, the content of the water-soluble organic solvent should better be small, and the ratio of the water-soluble organic solvent to water is preferably from more than 0 part by mass to not more than 10 parts by mass, more preferably from more than 0 part by mass to not more than 5 parts by mass, further preferably from more than 0 part by mass to not more than 1 part by mass, of the water-soluble organic solvent to 100 parts by mass of water. Most preferably, the aqueous medium is water alone (the content of a water-soluble organic solvent is 0 part by mass).

Further, in a case where the binder composition of the present invention contains water and a water-soluble organic solvent as the aqueous dispersing medium, and the fluorinated polymer is emulsified or dispersed in the aqueous dispersing medium, the content of the water-soluble organic solvent should better be small, and particularly preferably, no water-soluble organic solvent is contained. The content of the water-soluble organic solvent is preferably less than 5 parts by mass, more preferably less than 1 part by mass, further preferably less than 0.5 part by mass, particularly preferably less than 0.1 part by mass, per 100 parts by mass of the binder composition. If the water-soluble organic solvent exceeds 5 parts by mass, per 100 parts by mass of the binder composition, the stability of the binder composition is likely to deteriorate, agglomeration is likely to occur during the preparation of the electrode mixture with the electrode active material, etc., whereby the adhesion is likely to deteriorate.

The binder composition of the present invention may be either a binder composition comprising a binder made of a fluorinated copolymer, and an organic solvent, or a binder composition comprising a binder made of a fluorinated copolymer, and an aqueous medium.

However, an organic solvent is flammable in many cases and thus requires a careful attention in handling, and therefore, the binder composition is preferably a binder composition comprising a binder made of a fluorinated copolymer and an aqueous medium.

The proportion of the binder contained in the binder composition is preferably from 5 to 60 mass %, more preferably from 10 to 50 mass %, further preferably from 15 to 35 mass %, based on the entire amount of the binder composition. Further, the proportion of the fluorinated copolymer contained in the binder composition is preferably from 95 to 40 mass %, more preferably from 90 to 50 mass %, further preferably from 85 to 65 mass %, based on the entire amount of the binder composition. If the proportion of the fluorinated copolymer in the entire amount of the binder composition is low, the viscosity as the electrode mixture tends to be low, and the coating property to the current collector tends to deteriorate, and if the proportion of the fluorinated copolymer is high, the dispersion stability of the binder composition tends to deteriorate.

In a case where the binder composition of the present invention comprises a binder made of a fluorinated copolymer and an aqueous medium, the binder made of a fluorinated copolymer is preferably emulsified or dispersed in the aqueous medium, more preferably emulsified or dispersed in a state of particles. Particularly preferably, it is in a latex state.

In a case where the binder made of a fluorinated copolymer is emulsified or dispersed in the form of particles, the average particle size of the fluorinated copolymer is preferably from 10 to 500 nm, more preferably from 20 to 200 nm, further preferably from 30 to 150 nm, still further preferably from 50 to 150 nm, particularly preferably from 50 to 100 nm. If the average particle size is smaller than the lower limit value, the fluorinated copolymer tends to densely cover the entire surface of the electrode active material, whereby the internal resistance is likely to increase. On the other hand, if the average particle size is larger than the upper limit value, the binding force of the binder is likely to decrease. The average particle size of fine particles of the binder in the binder composition can be adjusted by a known method, such as the type, amount, etc. of the emulsifier. Further, the average particle size of fine particles of the binder can be measured by a dynamic light scattering method by means of a laser zeta electrometer ELS-8000, manufactured by Otsuka Electronics Co., Ltd.

The process for producing the binder composition of the present invention is not particularly limited. However, the above-described fluorinated copolymer may be produced by e.g. suspension polymerization, emulsion polymerization or solution polymerization, and the composition after the polymerization may be used as it is in a state where the fluorinated copolymer is dissolved in an organic solvent or dispersed in an aqueous dispersing medium. In such a case, it is preferred that the solvent or dispersing medium in the polymerization is made to be the same as the above-mentioned organic solvent or aqueous dispersing medium constituting the binder composition of the present invention.

In a case where the binder composition contains an organic solvent, a solution of a fluorinated copolymer produced by a solution polymerization may be used as it is. Whereas, in a case where the binder composition contains an aqueous medium, it is more preferred to use a composition having a fluorinated copolymer dispersed in an aqueous medium, produced by emulsion polymerization, as it is.

Otherwise, the binder composition of the present invention may be a composition obtained in such a manner that a fluorinated copolymer obtained by polymerization is purified to obtain a solid, and the solid is again dissolved in an organic solvent or dispersed in an aqueous dispersing medium. The organic solvent or aqueous dispersing medium to be used in such a case is preferably the above-mentioned organic solvent or aqueous dispersing medium constituting the binder composition of the present invention.

Now, a case wherein a fluorinated copolymer in the binder composition of the present invention is produced by emulsion polymerization, will be described.

In a case where a fluorinated copolymer is to be produced by emulsion polymerization, the emulsifier or dispersant to be used for the production may be one which is commonly used in an emulsion polymerization method, a suspension polymerization method, etc., and an ionic emulsifier is preferred, and an anionic emulsifier is more preferred, in view of excellent mechanical and chemical stability of a latex.

As such an anionic emulsifier, a known emulsifier may be used, and specific examples include a hydrocarbon type emulsifier (sodium lauryl sulfate or sodium dodecylbenzene sulfonate), a fluorinated alkyl carboxylate (such as ammonium perfluorooctanoate or ammonium perfluorohexanoate), a compound represented by the following formula (I) (hereinafter referred to as compound (I)), etc.

$$F(CF_2)_pO(CF(X)CF_2O)_qCF(X)COOA \quad (I)$$

In the formula (I), X is a fluorine atom or a $C_{1-3}$ perfluoroalkyl group, A is a hydrogen atom, an alkali metal or $NH_4$, p is an integer of from 1 to 10, and q is an integer of from 0 to 3.

As compound (I), the following compounds may be mentioned.

$F(CF_2)_2OCF_2CF_2OCF_2COONH_4$,

$F(CF_2)_2O(CF_2CF_2O)_2CF_2COONH_4$,

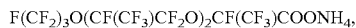

$F(CF_2)_3O(CF(CF_3)CF_2O)_2CF(CF_3)COONH_4$,

$F(CF_2)_3OCF_2CF_2OCF_2COONH_4$,

$F(CF_2)_3O(CF_2CF_2O)_2CF_2COONH_4$, $F(CF_2)_4OCF_2CF_2OCF_2COONH_4$,

$F(CF_2)_4O(CF_2CF_2O)_2CF_2COONH_4$,

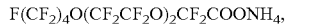

$F(CF_2)_2OCF(CF_3)CF_2OCF(CF_3)COONH_4$,

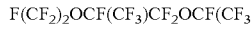

$F(CF_2)_2OCF_2CF_2OCF_2COONa$, $F(CF_2)_2O(CF_2CF_2O)_2CF_2COONa$,

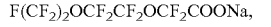

$F(CF_2)_3OCF_2CF_2OCF_2COONa$,

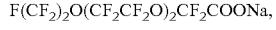

$F(CF_2)_3O(CF_2CF_2O)_2CF_2COONa$,

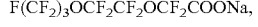

$F(CF_2)_4OCF_2CF_2OCF_2COONa$,

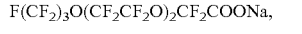

$F(CF_2)_4O(CF_2CF_2O)_2CF_2COONa$, etc.

The content of the emulsifier is preferably from 0.01 to 15 parts by mass, more preferably from 0.1 to 10 parts by mass, per 100 parts by mass of the aqueous medium.

Further, as a polymerization initiator, a water-soluble radical initiator commonly used in emulsion polymerization may be used, and the fluorinated copolymer can be produced in the same manner as in usual emulsion polymerization.

The electrode mixture for a non-aqueous secondary battery (hereinafter referred to simply as the "electrode mixture") of the present invention comprises the binder composition of the present invention and an electrode active material. The electrode mixture of the present invention may be applied to a positive electrode or to a negative electrode depending upon the type of the electrode active material to be incorporated.

The electrode active material to be used in the present invention is not particularly limited. As a positive electrode active material, a metal oxide such as $MnO_2$, $V_2O_5$ or $V_6O_{13}$, a metal sulfide such as $TiS_2$, $MoS_2$ or FeS, or a lithium complex metal oxide containing a transition metal such as Co, Ni, Mn, Fe or Ti, such as $LiCoO_2$, $LiNiO_2$ or $LiMn_2O_4$, may, for example, be mentioned. Further, as a negative electrode active material, for example, coke, graphite, mesophase pitch microspheres, a carbide of a polymer such as a phenol resin or polyparaphenylene, or a carbonaceous material such as gas phase-formed carbon fibers or carbon fibers, may, for example, be mentioned.

In the electrode mixture of the present invention, the ratio of the binder made of the fluorinated copolymer to the electrode active material is preferably from 0.01 to 10 parts by mass, more preferably from 0.5 to 8 parts by mass, further preferably 0.1 to 5 parts by mass, to 100 parts by mass of the electrode active material.

The content of the binder composition in the electrode mixture is not particularly limited, but the content of the binder composition is preferably determined so that the ratio of the binder to the electrode active material will be the above-mentioned ratio. The content of the binder composition in the electrode mixture is preferably from 0.1 to 20 parts by mass, more preferably from 1 to 8 parts by mass, of the binder composition, to 100 parts by mass of the electrode active material. If it is less than 0.1 part by mass, the strength of the electrode tends to be weak, or the adhesion strength between the electrode and the current collector tends to be weak. If it exceeds 20 parts by mass, a substantial increase in the internal resistance of the battery is likely to be led.

The electrode mixture of the present invention comprises the binder composition and the electrode active material, but may further contain an electrically conductive material as the case requires. When a binder composition containing an organic solvent is used, it may contain an organic solvent, and in a case where a binder composition containing an aqueous medium is used, it may contain an aqueous medium. Especially in an electrode mixture to be used for the production of a positive electrode, it is preferred that an electrically conductive material is contained, since it is thereby possible to lower the electrical resistance in the active material layer and to improve the discharge rate property of the non-aqueous secondary battery. As such an electrically conductive material, an electrically conductive carbon such as acetylene black, ketjen black, carbon black, graphite, vapor phase grown carbon fibers or carbon nanotubes may, for example, be mentioned. The content of the electrically conductive material in the electrode mixture is preferably from 0.1 to 30 parts by mass, more preferably from 1 to 10 parts by mass, to 100 parts by mass of the electrode active material. When the electrode mixture contains an electrically conductive material in a content within such a range, the effect to reduce the electrical resistance is large with an addition of a small amount of the electrically conductive material, such being advantageous.

The organic solvent or aqueous medium may suitably be added, since it serves to help uniform mixing of the respective components or to adjust the viscosity of the electrode mixture.

In addition to the above-described components, the electrode mixture may further contain other components such as carboxymethyl cellulose, methyl cellulose, etc.

The process for producing an electrode for a non-aqueous secondary battery of the present invention comprises applying the electrode mixture for a non-aqueous secondary battery of the present invention to a current collector, and removing the organic solvent or aqueous medium. Further, it is preferred that after removing the organic solvent or dispersing medium, the electrode is formed to have a desired thickness by pressing, as the case requires.

The process for producing an electrode for a secondary battery of the present invention may be applied to a positive electrode or a negative electrode. In a case where a positive electrode is to be produced, it is preferred that as the electrode active material, a positive electrode active material is used, and an electrode mixture comprising the binder composition of the present invention and an electrically conductive agent to be incorporated as the case requires, is applied to a positive electrode current collector, followed by removing the organic solvent or aqueous dispersing medium. In a case where a negative electrode is to be produced, it is preferred that a negative electrode mixture comprising a negative electrode active material and the binder composition is applied to a negative electrode current collector, followed by removing the organic solvent or aqueous dispersing medium.

As the method for applying the electrode mixture for a non-aqueous secondary battery of the present invention to a current collector, various coating methods may be mentioned. For example, a method of applying by means of a coating tool such as a doctor blade may be mentioned. The coating temperature is not particularly limited, but usually, a temperature in the vicinity of room temperature is preferred.

The removal of the organic solvent or aqueous dispersing medium is usually preferably carried out by drying at room temperature or under heating. The drying may be carried out by means of various driers. For example, a heating type vacuum drier may be mentioned. The drying temperature is not particularly limited, and it is usually preferably from room temperature to 150° C.

The pressing method may be carried out by means of a die press or a roll press. The thickness of the coating layer of the electrode mixture for a non-aqueous secondary battery in the electrode for a non-aqueous secondary battery is preferably from 0.5 to 2,000 µm, more preferably from 1 to 1,000 µm, particularly preferably from 10 to 500 µm, as the thickness after drying, or as the thickness after pressing in a case where pressing is further carried out.

The current collector in the present invention is not particularly limited so long as it is one made of an electrically conductive material, but usually, a metal foil, a metal net, a metal madreporite or the like, of aluminum, nickel, stainless steel, cupper or the like, may be mentioned. As the positive electrode current collector, aluminum is preferably used, and as the negative electrode current collector, cupper is preferably used. The thickness of the current collector is preferably from 1 to 100 µm. If it is less than 1 µm, the durability of the battery tends to be inadequate, and the reliability of the battery is likely to be low. On the other hand, if it exceeds 100 µm, the mass of the battery increases.

The non-aqueous secondary battery to which the binder composition of the present invention is applied, usually comprises a positive electrode, a negative electrode, a separator and a non-aqueous electrolyte. In the non-aqueous secondary battery of the present invention, the electrode obtained by the process of the present invention may be used for a positive electrode or a negative electrode, or may be used for both. In a non-aqueous secondary battery wherein it is used for either a positive electrode or a negative electrode, it is possible to use, as the counter electrode, a lithium metal or a lithium alloy such as a lithium aluminum alloy.

The electrode for a non-aqueous secondary battery of the present invention is useful for a battery of any form such as a cylindrical form, a sheet form, an angular form, etc. And, a non-aqueous secondary battery using the electrode of the present invention for the positive electrode and/or negative electrode and having a separator between the positive and negative electrodes and a non-aqueous electrolyte accommodated in a case, has high reliability even at a high temperature.

As the separator, a fine porous polymer film is used, and its material may, for example, be a nylon resin, a polyester resin, a cellulose acetate resin, a nitrocellulose resin, a polysulfone resin, a polyacrylonitrile resin, a polyvinylidene fluoride resin, a tetrafluoroethylene resin, a tetrafluoroethylene/ethylene copolymer resin, a polypropylene resin or a polyethylene resin.

In a non-aqueous secondary battery wherein the electrode of the present invention is used as at least one of the positive and negative electrodes, a non-aqueous electrolytic solution is used. The solvent for the non-aqueous electrolytic solution may, for example, be an aprotic organic solvent such as propylene carbonate, ethylene carbonate, dimethyl carbonate, ethylmethyl carbonate, diethyl carbonate, γ-butyrolactone or diethoxyethane. Further, the electrolyte may, for example, be a lithium salt such as $LiClO_4$, $LiBF_4$, $LiPF_6$, $LiAsF_5$, $CF_3SO_3Li$ or $(CF_3SO_2)_2NLi$.

EXAMPLES

Now, Examples of the present invention will be described. However, the following Examples are merely exemplary, and the present invention is by no means limited thereto.

The tests and evaluations in Examples and Comparative Examples are carried out by the following methods.

(1) Weight Average Molecular Weight

The weight average molecular weight of a fluorinated copolymer was measured by gel permeation chromatography (GPC) under the following conditions.

GPC apparatus: HLC-8220, by Tosoh Corporation
Column: shodex KF-806M (two columns), shodex KF-802 (one column), manufactured by Showa Denko K.K.
Detector: RI detector (differential refractometer)
Solvent: tetrahydrofuran
Temperature: 40° C.
Flow rate: 1.0 mL/min
Concentration: 0.5 mass %

(2) Average Particle Size

The average particle size of fine particles of a binder made of a fluorinated copolymer in the binder composition was measured by a dynamic light scattering method by means of laser zeta electrometer ELS-8000, manufactured by Otsuka Electronics Co., Ltd.

(3) Copolymer Composition

A fluorinated copolymer was dissolved in deuterated tetrahydrofuran, and 13C-NMR was measured to analyze the copolymer composition of the fluorinated copolymer.

(4) Adhesion (Peel Strength)

An electrode produced by applying an electrode mixture to a current collector, was cut in a strip form of 2 cm in width×10 cm in length and fixed so that the coating film surface of the electrode mixture faced upward. An adhesive tape was bonded to the coating film surface of the electrode mixture, and the tape was peeled in a 90° direction at a rate of 10 mm/min, whereby the strength (N) was measured. This measurement was repeated five times, and the average value of the strength was taken as the peel strength. The larger the value, the better the adhesion (bonding property).

(5) Electrolytic Solution Resistance

As electrolytic solution resistance, the degree of swelling of an electrode with a solvent of an electrolytic solution was evaluated. An electrode was immersed in a mixed solution of propylene carbonate/ethylene carbonate=50/50 (vol %) at 100° C., and the time (hereinafter referred to as "peel time") until the coating film of the electrode mixture for a non-aqueous secondary battery is peeled from the metal foil by swelling, was measured. The longer the time, the smaller the degree of swelling and the better the electrolytic solution resistance.

(6) Charge and Discharge Characteristics (Test Temperature: 25° C.)

In each case, as a counter electrode, one having a lithium metal foil pressed to a cupper net was used, and via a porous polyethylene separator (25 μm), a non-aqueous secondary battery was prepared with an electrolytic solution of 1M $LiPF_6$ in ethylmethyl carbonate/ethylene carbonate (volume ratio of 3:1). Then, in a case where the electrode in Example is a positive electrode, charging is carried out at a constant current corresponding to 0.2 C to 4.3 V (the voltage represents a voltage to lithium), and charging was further carried out until the current value became 0.02 C at the charging upper limit voltage, and then, discharging was carried out at a constant current corresponding to 0.2 C to 3 V, to complete a cycle. Further, in a case where the electrode in Example was a negative electrode, discharging was carried out at a constant current corresponding to 0.2 C to 0.05 V, and discharging was further carried out until the current value became 0.02 C at the discharging lower limit voltage, and then, charging was carried out at a constant current corresponding to 0.2 C to 3.0 V, to complete a cycle. The discharge capacity in the 30th charge and discharge cycle to the discharge capacity in the first cycle was obtained as the capacity retention rate.

Production Example 1

The interior of a stainless steel pressure resistant reactor having an internal capacity of 3,200 mL and equipped with stirring anchor vanes, was deaerated, and then to the reactor, 1,700 g of deionized water, 58 g of disodium hydrogen phosphate 12 hydrate, 1.0 g of sodium hydroxide, 9 g of sodium lauryl sulfate and 4.4 g of ammonium persulfate were added. Further, an aqueous solution having 0.4 g of disodium ethylenediamine tetraacetate dihydrate (hereinafter referred to as EDTA) and 0.3 g of ferrous sulfate heptahydrate dissolved in 200 g of deionized water, was added to the reactor. The pH of the aqueous medium in the reactor was 9.5 at that time.

Then, at 40° C., a monomer mixed gas of tetrafluoroethylene (hereinafter referred to as TFE)/propylene (hereinafter referred to as P)=88/12 (molar ratio) was injected under pressure so that the internal pressure of the reactor became 2.50 MPaG. By rotating anchor vanes at 300 rpm, an aqueous solution containing 2.5 mass % of sodium hydroxymethanesulfinate dihydrate (hereinafter referred to as Rongalite) having the pH adjusted to 10.0 with sodium hydroxide, was added to the reactor to initiate a polymerization reaction. Thereafter, an aqueous solution containing 2.5 mass % of Rongalite was continuously added to the reactor by means of a high pressure pump.

Along with the progress of the polymerization, the pressure in the reactor decreased, and when the internal pressure of the reactor decreased to 2.49 MPaG, a monomer mixed gas of TFE/P=56/44 (molar ratio) was injected under the self pressure to raise the internal pressure of the reactor to 2.51 MPaG. This operation was repeated to maintain the internal pressure of the reactor to be from 2.49 to 2.51 MPaG, and the polymerization reaction was continued. When the total amount of the injected amount of the monomer mixed gas of TFE/P became 900 g, addition of the aqueous solution containing 2.5 mass % of Rongalite was stopped, and the internal temperature of the reactor was cooled to 10° C. to stop the polymerization reaction and to obtain a binder composition being a latex containing fluorinated copolymer A. The amount of the aqueous solution containing 2.5 mass % of Rongalite was 63 g. The polymerization time was 8 hours. The solid content in the binder composition was 34 mass %, and the average particle size of fine particles of the binder made of the fluorinated copolymer was 120 nm. The weight average molecular weight of fluorinated copolymer A was 180,000, and the copolymer composition was repeating units derived from TFE/repeating units derived from P=56/44 (molar ratio).

Production Example 2

The interior of a stainless steel pressure resistant reactor having an internal capacity of 3,200 mL and equipped with stirring anchor vanes, was deaerated, and then, to the reactor, 1,700 g of deionized water, 58 g of disodium hydrogen phosphate 12 hydrate, 1.0 g of sodium hydroxide, 9 g of sodium lauryl sulfate, and 4.4 g of ammonium persulfate were added. The pH of the aqueous medium in the reactor was 9.5 at that time.

Then, at 75° C., a monomer mixed gas of TFE/P=88/12 (molar ratio) was injected under pressure so that the internal pressure of the reactor became 2.50 MPaG. By rotating the anchor vanes at 300 rpm, a polymerization reaction was initiated.

Along with the progress of the polymerization, the pressure in the reactor decreased, and when the internal pressure of the reactor decreased to 2.49 MPaG, a monomer mixed gas of TFE/P=56/44 (molar ratio) was injected under the self pressure to raise the internal pressure of the reactor to 2.51 MPaG. This operation was repeated to maintain the internal pressure of the reactor to be from 2.49 to 2.51 MPaG, and the polymerization reaction was continued. When the total amount of the injected amount of the monomer mixed gas of TFE/P became 900 g, the internal temperature of the reactor was cooled to 10° C. to terminate the polymerization reaction and to obtain a binder composition being a latex containing fluorinated copolymer B. The polymerization time was 8 hours. The solid content in the binder composition was 34 mass %, and the average particle size of fine particles of the binder made of the fluorinated copolymer was 80 nm. The weight average molecular weight of fluorinated copolymer B was 130,000, and the copolymer composition was repeating units derived from TFE/repeating units derived from P=56/44 (molar ratio).

Production Example 3

A binder composition being a latex containing fluorinated copolymer C was obtained in the same manner as in Production Example 1 except that the temperature during the polymerization was changed to 25° C. The amount of the aqueous solution containing 2.5 mass % of Rongalite was 58 g. The polymerization time was 9 hours. The solid content in the binder composition was 33 mass %, and the average particle size of fine particles of the binder made of the fluorinated copolymer was 150 nm. The weight average molecular weight of fluorinated copolymer C was 280,000, and the copolymer composition was repeating units derived from TFE/repeating units derived from P=56/44 (molar ratio).

Production Example 4

A binder composition being a latex containing fluorinated copolymer D was obtained in the same manner as in Production Example 1 except that the amount of deionized water added to the reactor was changed to 1,600 g, and 100 g of t-butanol was further added. The amount of the aqueous solution containing 2.5 mass % of Rongalite was 56 g. The polymerization time was 8 hours. The solid content in the binder composition was 33 mass %, and the average particle size of fine particles of the binder made of the fluorinated copolymer was 180 nm. The weight average molecular weight of fluorinated copolymer D was 200,000, and the copolymer composition was repeating units derived from TFE/repeating units derived from P=56/44 (molar ratio). Further, t-butanol in the binder composition was 3.5 mass %.

Production Example 5

The interior of a stainless steel pressure resistant reactor having an internal capacity of 3,200 mL and equipped with stirring anchor vanes, was deaerated, and to the reactor, 1,700 g of deionized water, 58 g of disodium hydrogen phosphate 12 hydrate, 1.0 g of sodium hydroxide, 9 g of sodium lauryl sulfate, and 4.4 g of ammonium persulfate were added. Further, an aqueous solution having 0.4 g of EDTA and 0.3 g of ferrous sulfate heptahydrate dissolved in 200 g of deionized water, was added to the reactor. The pH of the aqueous medium in the reactor was 9.5 at that time.

Then, at 25° C., a monomer mixed gas of TFE/P/vinylidene fluoride=25/6/69 (molar ratio) was injected under pressure so that the internal pressure of the reactor became 2.50 MPaG. By rotating the anchor vanes at 300 rpm, an aqueous solution containing 6.9 mass % of Rongalite having the pH adjusted to 10.0 by sodium hydroxide (hereinafter referred to as a 6.9 mass % Rongalite aqueous solution) was added to the reactor to initiate a polymerization reaction. Thereafter, the 6.9 mass % Rongalite aqueous solution was continuously added to the reactor by means of a high pressure pump.

Along with the progress of the polymerization, the pressure in the reactor decreased, and when the internal pressure of the reactor decreased to 2.49 MPaG, a monomer mixed gas of TFE/P/vinylidene fluoride=39/26/35 (molar ratio) was injected under the self pressure to raise the internal pressure of the reactor to 2.51 MPaG. This operation was repeated to maintain the internal pressure of the reactor to be from 2.49 to 2.51 MPaG, and the polymerization reaction was continued. When the total amount of the injected amount of the monomer mixed gas of TFE/P became 900 g, the addition of the 6.9 mass % Rongalite aqueous solution was stopped, and the internal temperature of the reactor was cooled to 10° C. to terminate the polymerization reaction and to obtain a binder composition being a latex containing fluorinated copolymer E. The added amount of the 6.9 mass % Rongalite aqueous solution was 60 g. The polymerization time was 8 hours. The solid content in the binder composition was 34 mass %, and the average particle size of fine particles of the binder made of the fluorinated copolymer was 100 nm. The weight average molecular weight of fluorinated copolymer E was 220,000, and the copolymer composition was repeating units derived from TFE/repeating units derived from P/repeating units derived from vinylidene fluoride=39/26/35 (molar ratio).

Production Example 6

To the latex containing fluorinated copolymer E obtained in Production Example 5, a 1.5 mass % calcium chloride aqueous solution was added to agglomerate the latex of fluorinated copolymer E, and fluorinated copolymer E was precipitated, collected by filtration and recovered. Then, fluorinated copolymer E was washed with deionized water and dried for 15 hours in an oven of 100° C. to obtain white fluorinated copolymer E. This fluorinated copolymer E was dissolved in an N-methylpyrrolidone solution having a water content of 30 ppm to prepare an N-methylpyrrolidone solution wherein the concentration of fluorinated copolymer E was 10 mass %.

Production Example 7

A binder composition being a latex containing fluorinated copolymer F was obtained in the same manner as in Production Example 1 except that the temperature during the polymerization was changed to 15° C. The added amount of the 2.5 mass % Rongalite aqueous solution was 50 g. The polymerization time was 12 hours. The solid content in the binder composition was 32 mass %, and the average particle size of fine particles of the binder made of the fluorinated copolymer was 200 nm. The weight average molecular weight of fluorinated copolymer F was 330,000, and the copolymer composition was repeating units derived from TFE/repeating units derived from P=56/44 (molar ratio).

Example 1

To 10 parts by mass of a 2 mass % sodium carboxymethyl cellulose aqueous solution, 95 parts by mass of $LiCoO_2$ having an average particle size of 8 μm and 5 parts by mass of acetylene black were mixed, and water was added and stirred so that the solid content concentration became 70 mass %. Then, 5 parts by mass of the binder composition containing fluorinated copolymer A obtained in Production Example 1 was added and stirred to obtain a uniform slurry. The obtained slurry was applied to an aluminum foil (current collector) having a thickness of 15 μm and having the surface roughened, by means of a doctor blade, so that the thickness after drying would be 120 μm, and dried in a vacuum drier at 120° C. and then rolled by a roll press at room temperature so that the coating layer would be 110 μm, followed by cutting out in a size of 1.5 cm×2.0 cm to obtain a positive electrode 1. The evaluation results are shown in Table 1.

Example 2

A positive electrode 2 having a coating film of an electrode mixture was obtained in the same manner as in Example 1 except that instead of the binder composition containing fluorinated copolymer A obtained in Production Example 1, the binder composition containing fluorinated copolymer B obtained in Production Example 2 was used. The evaluation results are shown in Table 1.

Example 3

A positive electrode 3 having a coating film of an electrode mixture was obtained in the same manner as in Example 1 except that instead of the binder composition containing fluorinated copolymer A obtained in Production Example 1, the binder composition containing fluorinated copolymer C obtained in Production Example 3 was used. The evaluation results are shown in Table 1.

Example 4

A positive electrode 4 having a coating film of an electrode mixture was obtained in the same manner as in Example 1 except that instead of the binder composition containing fluorinated copolymer A obtained in Production Example 1, the binder composition containing fluorinated copolymer D obtained in Production Example 4 was used. The evaluation results are shown in Table 1.

Example 5

A positive electrode 5 having a coating film of an electrode mixture was obtained in the same manner as in Example 1 except that instead of the binder composition containing fluorinated copolymer A obtained in Production Example 1, the binder composition containing fluorinated copolymer E obtained in Production Example 5 was used. The evaluation results are shown in Table 1.

Example 6

95 parts by mass of $LiCoO_2$ having an average particle size of 8 μm and 5 parts by mass of acetylene black were preliminarily mixed to obtain a mixture 6. On the other hand, 10 parts by mass of methyl cellosolve was added to 20 parts by mass of the N-methylpyrrolidone solution containing 10 mass % of fluorinated copolymer E obtained in Production Example 6, to prepare a solution 6. To the solution 6, the mixture 6 was added, stirred and mixed to obtain a dispersion 6 of the mixture 6. The dispersion 6 was applied to an aluminum foil (current collector) having a thickness of 15 μm and having the surface roughened, by means of a doctor blade, so that the thickness after drying would be 120 μm, and dried in a vacuum drier at 120° C. and then rolled by a roll press at room temperature so that the coating layer would be 110 μm, followed by cutting out in a size of 1.5 cm×2.0 cm to obtain a positive electrode 6. The evaluation results are shown in Table 1.

Comparative Example 1

A positive electrode 7 having a coating film of an electrode mixture was obtained in the same manner as in Example 1 except that instead of the binder composition containing fluorinated copolymer A obtained in Example 1, the binder composition containing fluorinated copolymer F obtained in Production Example 7 was used. The evaluation results are shown in Table 1.

Example 7

To 10 parts by mass of a 2 mass % sodium carboxymethyl cellulose aqueous solution, 95 parts by mass of needle coke having an average particle size of 10 μm was mixed, and water was added and stirred so that the solid content concentration became 60 mass %. Further, 5 parts by mass of the binder composition containing fluorinated copolymer A obtained in Production Example 1 was added and stirred to obtain a uniform slurry. The obtained slurry was applied to a copper foil (current collector) having a thickness of 15 μm and having the surface roughened, by a doctor blade, so that the thickness after drying would be 120 μm, and dried in a vacuum drier at 120° C. and then rolled by a roll press at room temperature so that the coating layer would be 110 μm, followed by cutting out in a size of 1.5 cm×2.0 cm to obtain a negative electrode 1. The evaluation results are shown in Table 1.

Example 8

A negative electrode 2 having a coating film of an electrode mixture was obtained in the same manner as in Example 7 except that instead of the binder composition containing fluorinated copolymer A obtained in Production Example 1, the binder composition containing fluorinated copolymer B obtained in Production Example 2 was used. The evaluation results are shown in Table 1.

Comparative Example 2

A negative electrode 3 having a coating film of an electrode mixture was obtained in the same manner as in Example 7 except that instead of the binder composition containing fluorinated copolymer A obtained in Production Example 1, the binder composition containing fluorinated copolymer F obtained in Production Example 7 was used. The evaluation results are shown in Table 1.

TABLE 1

| | | Examples/Comparative Examples | | | | | |
|---|---|---|---|---|---|---|---|
| | | Example 1 | Example 2 | Example 3 | Example 4 | Example 5 | Example 6 |
| Electrode | | Positive electrode 1 | Positive electrode 2 | Positive electrode 3 | Positive electrode 4 | Positive electrode 5 | Positive electrode 6 |
| Electrode active material | | $LiCoO_2$ | $LiCoO_2$ | $LiCoO_2$ | $LiCoO_2$ | $LiCoO_2$ | $LiCoO_2$ |
| Fluorinated copolymer | | A | B | C | D | E | F |
| Composition (4F/P/VdF) | | 56/44/0 | 56/44/0 | 56/44/0 | 56/44/0 | 35/29/35 | 35/29/35 |
| Molecular weight | | 180,000 | 130,000 | 280,000 | 200,000 | 220,000 | 220,000 |
| Organic solvent or aqueous dispersing medium | | Water | Water | Water | Water/ t-butanol | Water | NMP |
| Adhesion | Peel strength (N) | 0.25 | 0.30 | 0.2 | 0.2 | 0.21 | 0.18 |
| Electrolytic solution resistance | Peel time (min) | 250 | 300 | 200 | 180 | 200 | 180 |
| Charge and discharge characteristics | Capacity retention rate (%) | 98 | 99 | 97 | 96 | 98 | 95 |

TABLE 1-continued

| | | Examples/Comparative Examples | | | |
|---|---|---|---|---|---|
| | | Example 7 | Example 8 | Comparative Example 1 | Comparative Example 2 |
| Electrode | | Negative electrode 1 | Negative electrode 2 | Positive electrode 7 | Negative electrode 3 |
| Electrode active material | | Needle coke | Needle coke | $LiCoO_2$ | Needle coke |
| Fluorinated copolymer | | A | B | F | F |
| Composition (4F/P/VdF) | | 56/44/0 | 56/44/0 | 56/44/0 | 56/44/0 |
| Molecular weight | | 180,000 | 130,000 | 330,000 | 330,000 |
| Organic solvent or aqueous dispersing medium | | Water | Water | Water | Water |
| Adhesion | Peel strength (N) | 0.30 | 0.35 | 0.10 | 0.10 |
| Electrolytic solution resistance | Peel time (min) | 280 | 330 | 100 | 100 |
| Charge and discharge characteristics | Capacity retention rate (%) | 98 | 99 | 90 | 90 |

Example 9

Using the positive electrode 1 prepared in Example 1 and using, as a negative electrode, one having a lithium metal foil pressed to a copper net, via a porous polyethylene separator (25 μm), a non-aqueous secondary battery was prepared with an electrolyte solution of 1M $LiPF_6$ in ethylmethyl carbonate/ethylene carbonate (volume ratio 3:1). Then, at a temperature of 25° C., charging was carried out at a constant current corresponding to 0.2 C to 4.5 V (the voltage represents a voltage to lithium), and charging was further carried out until the current value became 0.02 C at the charging upper limit voltage, and thereafter, discharging was carried out at a constant current corresponding to 0.2 C to 3 V, to complete a cycle. The discharge capacity in the 30th charge and discharge cycle to the discharge capacity in the first cycle was obtained as the capacity retention rate. As a result, the capacity retention rate was 92%.

Comparative Example 3

The capacity retention rate was obtained in the same manner as in Example 9 by using the positive electrode 7 prepared in Comparative Example 1. As a result, the capacity retention rate was 70%.

It is evident that the positive electrode 1 employing the binder composition of the present invention has a high capacity retention rate even after charge and discharge at a high charging voltage at 4.5 V.

INDUSTRIAL APPLICABILITY

The binder composition of the present invention is useful for the production of an electrode mixture for a non-aqueous secondary battery, an electrode for a non-aqueous secondary battery, and a non-aqueous secondary battery.

This application is a continuation of PCT Application No. PCT/JP2010/069630, filed Nov. 4, 2010, which is based upon and claims the benefit of priority from Japanese Patent Application No. 2009-255030 filed on Nov. 6, 2009. The contents of those applications are incorporated herein by reference in its entirety.

What is claimed is:

1. A binder composition for a non-aqueous secondary battery, which comprises a binder made of a fluorinated copolymer having repeating units derived from tetrafluoroethylene and repeating units derived from propylene, and an aqueous dispersing medium, wherein the fluorinated copolymer has a weight average molecular weight of from 10,000 to 300,000,
    wherein the binder made of the copolymer is emulsified or dispersed in the aqueous dispersing medium, and
    wherein the binder made of the copolymer is particles having an average particle size of from 10 to 500 nm.

2. The binder composition for a non-aqueous secondary battery according to claim 1, wherein the fluorinated copolymer is a fluorinated copolymer having repeating units derived from tetrafluoroethylene and repeating units derived from propylene and not having repeating units derived from vinylidene fluoride.

3. The binder composition for a non-aqueous secondary battery according to claim 1, wherein the fluorinated copolymer is a fluorinated copolymer consisting solely of repeating units derived from tetrafluoroethylene and repeating units derived from propylene.

4. The binder composition for a non-aqueous secondary battery according to claim 1, which further contains an alcohol, wherein the content of the alcohol is less than 1 part by mass per 100 parts by mass of the binder composition.

5. An electrode mixture for a non-aqueous secondary battery, which comprises the binder composition for a non-aqueous secondary battery as defined in claim 1 and an electrode active material.

6. A process for producing an electrode for a non-aqueous secondary battery, which comprises applying the electrode mixture for a non-aqueous secondary battery as defined in claim 5 to a current collector, and removing the organic solvent.

7. A non-aqueous secondary battery comprising an electrode for a non-aqueous secondary battery obtained by the process as defined in claim 6, a separator and an electrolyte.

8. The binder composition for a non-aqueous secondary battery according to claim 1, wherein the weight average molecular weight is from 20,000 to 250,000.

9. The binder composition for a non-aqueous secondary battery according to claim 1, wherein the weight average molecular weight is from 20,000 to 200,000.

10. The binder composition for a non-aqueous secondary battery according to claim 1, wherein the weight average molecular weight is from 30,000 to 190,000.

\* \* \* \* \*